United States Patent
Bartolini et al.

(10) Patent No.: US 6,529,315 B2
(45) Date of Patent: Mar. 4, 2003

(54) OPTICAL AMPLIFIER PROVIDING DISPERSION COMPENSATION

(75) Inventors: Glenn Bartolini, Waltham, MA (US); Graeme Pendock, Merrimack, NH (US); John Zyskind, Concord, MA (US)

(73) Assignee: Sycamore Networks, Inc, Chelmsford, MA (US)

( * ) Notice: Subject to any disclaimer, the term of this patent is extended or adjusted under 35 U.S.C. 154(b) by 0 days.

(21) Appl. No.: 09/844,875

(22) Filed: Apr. 27, 2001

(65) Prior Publication Data

US 2002/0159131 A1 Oct. 31, 2002

(51) Int. Cl.[7] .................................................. H01S 3/00
(52) U.S. Cl. ..................................... 359/334; 359/337.5
(58) Field of Search ............................. 359/337.5, 334

(56) References Cited

FOREIGN PATENT DOCUMENTS

| EP | 1176742 A2 * | 1/2002 |
|----|--------------|--------|
| JP | 02002040496 A * | 2/2002 |
| JP | 02002062450 A * | 2/2002 |

OTHER PUBLICATIONS

Hansen et al, "Raman Amplification for Loss Compensation in Dispersion Compensating Fibre Modules" (1998), Electronic Letters, vol. 34, No. 11, pp 1136 and 1137.*
Masuda, "Ultra–Wide–Band Hybrid Amplifier Consisting of Two Dispersion_Compensating Fibres For Raman Amplification and Thulium–Doped Fibre" (2002), Electronic Letters, vol. 38, No. 11 pp 550 and 501.*
Hansen, P.B. et al., "Capaciy Upgrades of Transmission Systems by Raman Amplification", *IEEE Photonics Technology Letters* vol. 9, Feb 1997.
Stentz, A., "Raman and Cladding–Pumped Fiber Amplifiers and Lasers", Presentation to the Attendees of Optical Fiber Communications Conference, San Diego, CA, Feb. 1999.

* cited by examiner

Primary Examiner—Mark Hellner
(74) Attorney, Agent, or Firm—Wolf, Greenfield & Sacks, P.C.

(57) ABSTRACT

A dispersion-compensating fiber amplifier having a Raman pumped dispersion-compensating fiber and a distributed optical amplifier. The dispersion-compensating fiber is pumped such that the noise contribution of the dispersion-compensating fiber is reduced.

74 Claims, 10 Drawing Sheets

OPTICAL AMPLIFIER PROVIDING DISPERSION COMPENSATION

BACKGROUND OF THE INVENTION

1. Field of Invention

The present invention relates to optical amplifiers, and more particularly, to Raman optical amplifiers providing dispersion compensation.

2. Description of Related Art

In long haul optical communications systems it is desirable to maximize an optical fiber's capacity to carry information (i.e. maximize the aggregate number of bits per second that can be transmitted on the fiber) and to maximize the distance that the signals can propagate in the optical domain before it is necessary to resort to expensive opto-electronic regenerators.

Dense Wavelength Division Multiplexing (DWDM) is a technology for optical communications which uses densely packed wavelengths of light to effectively multiply the capacity of the optical fiber. Each wavelength carries a distinct signal. The performance of such systems is limited by optical attenuation which progressively weakens the optical strength of the signals as they propagate along the fiber. DWDM optical communications systems are practical because of the use of optical amplifiers which restore the strength of signals of all wavelengths simultaneously, to counteract the effects of optical attenuation. Amplifiers are typically selected to provide enough amplification to restore the signal but not more than necessary to restore the signal. Too much amplification would upset the gain balance, and can lead to impairment to signal transmission.

The most commonly deployed optical amplifier is an Erbium-Doped Fiber Amplifier (EDFA). An EDFA amplifies wavelengths of light within a large frequency band (~4 THz for a conventional EDFA at the time of this writing). However, although this frequency space is large, it is relatively small compared with the total bandwidth of the low loss window of the optical fiber. Thus, the EDFA bandwidth generally restricts the usable bandwidth (BW). A typical conventional band (C-band) EDFA operates from approximately 1528 to approximately the 1563 nm range. L-band EDFAs operate approximately from 1567 to the 1605 nm range. It is a fundamental property of optical amplifiers that in addition to delivering signal gain which strengthens the signals, they also produce noise (in the form of amplified spontaneous emission, ASE) which degrades the signal.

For economic reasons, it is desirable that the lengths of transmission fiber between these optical amplifiers be as large as possible. However, the further the signals must travel from one optical amplifier to the next, the more the signals weaken due to optical attenuation, and the more severely the noise added at each amplifier degrades the signal. The distances over which such signals can be transmitted are generally limited by the accumulation of such noise.

When such optical noise is the most important impairment, the quality of the signal at the end of the system can be improved by increasing the optical power produced by each optical amplifier. In practical systems, the ability to increase optical power is constrained; specifically because when the optical powers of signals in the channels in the fiber exceed a certain level, they create optical nonlinear effects (such as four wave mixing, self phase modulation and/or cross phase modulation) which distort the signals and impair their quality. Thus, it is very important to minimize the impairments arising from optical noise without increasing the optical power beyond the nonlinear limit.

In addition to increasing the capacity of optical fibers to carry signals by using DWDM technology, their capacity is also increased by Time Division Multiplexing (TDM) (i.e. multiplexing time-tributary signals at lower bit rates into multiplexed aggregated signal streams at higher bit rates which are transmitted over the fiber as a single serial stream of bits at the aggregated rate). The extent of such multiplexing is limited in part by the ability to process, produce and detect such high speed Time Division Multiplexed signal streams but even more so by the ability of such very short, very frequent pulses to maintain their integrity while propagating along long lengths of transmission optical fiber.

The most severe impairment limiting the data rate of TDM signal channels is chromatic dispersion. Chromatic dispersion is a property of the optical fiber which causes light of different wavelengths to propagate at different speeds. Any optical pulse is made up of light of a range of wavelengths and the shorter the pulse, the wider the range of wavelengths which make up the pulse. In the presence of chromatic dispersion, these wavelengths propagate at different speeds and this causes the pulse to spread out in time, with the longer wavelength components of the pulse trailing further and further behind its faster, shorter wavelength components as the pulse propagates down the fiber. The signal is impaired when the pulses spread sufficiently that they overlap with the neighboring preceding or subsequent pulses and can no longer be distinguished by the receiver.

The chromatic dispersion of silica, the material from which most optical fibers are made, is zero at a wavelength of about 1300 nm. At this wavelength, conventional single mode fibers, which are widely deployed, also have zero chromatic dispersion. Near 1550 nm, where transmission fibers have their lowest optical loss and where optically amplified systems using EDFAs operate, such fibers have high dispersion, typically 17 ps/nm/km. For such fibers, the typically 100 ps wide pulses used in 10 Gb/s systems spread in time so quickly as they propagate that data cannot be transmitted further than about 50 km before electrical regeneration of the pulses becomes necessary.

During the 1980's, Dispersion Shifted Fibers (DSF) which have zero dispersion near 1550 nm were developed and widely deployed in some networks because of the potential to support higher data rates with very low dispersion. However, such fibers cannot support DWDM transmission because the impairments that result from nonlinear interactions between the different wavelength channels (primarily four wave mixing but also cross phase modulation) are more severe when the dispersion is small and the different channels travel at similar speeds. For this reason, for high capacity systems which combine high channel multiplicity dense wavelength division multiplexing with high data rate TDM on each of the WDM channels, the preferred transmission fiber is so-called Non-Zero Dispersion Shifted Fiber (NZDSF). In NZDSF the dispersion in the wavelength region of interest near 1550 nm ranges typically from about 2 to 4 ps/nm/km, large enough so that the nonlinear interactions among channels will not unduly impair the signal quality. However, the dispersion of NZDSF, while less than that of standard single mode fiber, is still large enough that for long-haul transmission (i.e., several hundred km or more) the dispersion-induced pulse broadening will limit the transmission distance for 10 Gb/s systems; for the higher speed 40 Gb/s systems, the limitations will be sixteen times more stringent.

Dispersion compensation, which reverses the impairment caused by dispersion, is a key technology for the transmission of high-speed TDM signals (i.e., 10 Gb/s, 40 Gb/s and more) over standard single mode fiber and over NZDSF. Dispersion-compensating fiber (DCF) consists of a fiber specially designed to have chromatic dispersion with a sign opposite to that of conventional single mode fibers (i.e., light with longer wavelengths travels faster than light with shorter wavelengths). Pulses which have been dispersed (i.e., broadened in time) by propagating over dispersive optical fiber can be narrowed to their original width, restoring the integrity of the signal, by traversing a DCF the length of which is chosen so that the faster traveling light of longer wavelengths—which are the slower wavelengths in the transmission fiber - exactly catch up to the light with shorter wavelengths which had left them behind.

In the absence of distortion arising from optical nonlinearities, compensation for dispersion can be provided anywhere in the system regardless of where the dispersion was incurred. But, for signals in the nonlinear regime, it is important that dispersion be compensated regularly, with sufficient frequency that irreversible pulse distortions suffered between dispersion-compensating elements are small. Thus, dispersion-compensating fibers are often deployed in optical amplifiers, and often at each optical amplifier or repeater site.

Figure 1:
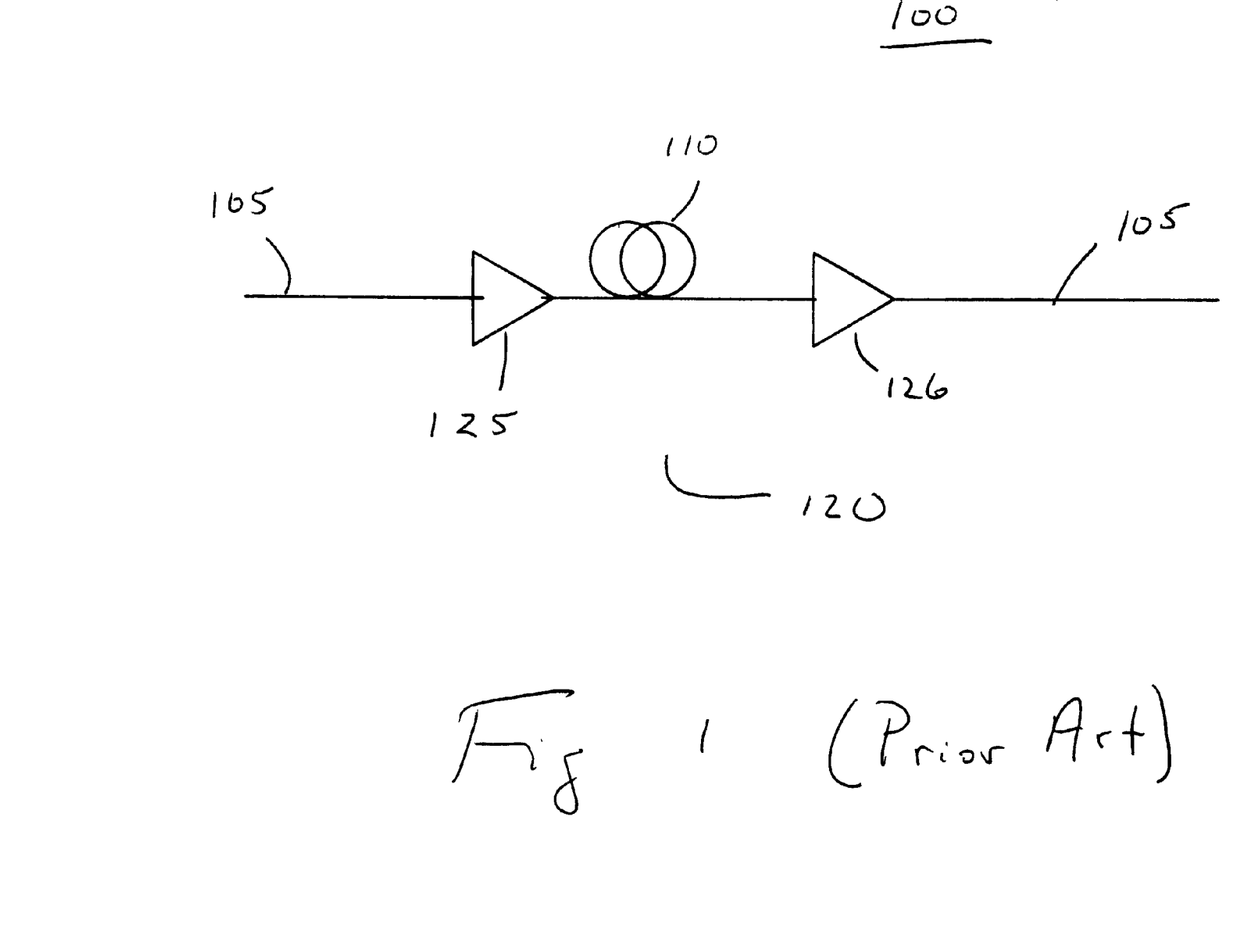
FIG. 1 illustrates a typical optical amplifier providing amplification and dispersion compensation.

The optical loss of DCF is significant. To compensate for the optical loss in a signal transmitted through DCF, optical amplification must be used. FIG. 1 illustrates a typical optical amplifier 100 providing amplification and dispersion compensation to a signal propagating in transmission fiber 105. Typically, the DCF 110 is placed in the middle of an EDFA 120 so that the amplification preceding the DCF (represented by 125) shields the DCF's loss from the amplifier input, where it would increase the noise figure (degrading the noise performance); and the amplification following the DCF (represented by 126) shields the DCF's loss from the amplifier output, where it would diminish the launched signal power (which would also degrade the noise performance). The additional optical amplification required at each repeater, to compensate for DCF loss, results in additional noise accumulation which diminishes the reach of the system and/or its capacity to carry information.

Distributed Raman amplification provides a method of amplifying a signal. Raman amplification is a nonlinear optical effect in which a strong pump beam in a common transmission fiber produces gain at lower frequencies, with the highest gain produced for light with an optical frequency about 11 terahertz (11×10 Hertz) lower than that of the pump beam. For a pump wavelength near 1450 nm this frequency shift corresponds to a wavelength difference of about 100 nm, i.e. gain is produced over a roughly 30 nm band around 1545 nm corresponding roughly to the C-band where conventional erbium-doped fiber amplifiers produce gain. As distinct from the case for Erbium-Doped Fiber Amplifiers, no special dopants (such as erbium) are required to produce the gain, and signals experience the gain not just in the vicinity of the pump but also over an appreciable length of fiber extending over approximately 20 km. By launching a Raman pump beam into the fiber span in the reverse direction of the signal so that it counterpropagates (i.e., backward propagates) relative to the transmitted signal, the effective input of the amplifier can be shifted backward in the fiber to a location where the signal, having experienced less optical attenuation, has greater power. In this way, the degradation in signal-to-noise ratio produced by the combined optical amplifier, consisting of the distributed Raman amplifier and the subsequent discrete Erbium-Doped Fiber Amplifier, is reduced by a large factor; this enables the signals to travel further before suffering the same degree of degradation due to optical amplifier noise. Distributed Raman Amplification can be used to increase the aggregate distance over which the signals can be transmitted without optoelectronic regeneration, to support higher bit-rates in each of the DWDM channels, to support more DWDM channels, or a combination of all three.

The magnitude of the Raman gain, and thus the reduction in noise accumulation, increases as the Raman pump power is increased. In practical optical communications systems, however, there are limits to the reductions in noise accumulation which can be achieved with Raman amplification. One limitation arises from the problems associated with the high power required to produce large Raman gains in transmission fibers, typically from 500 mW to over 1 Watt, depending on the characteristics of the fiber. Such high powers require interlock shutoff systems to meet safety standards and also pose the risk of damage to connectors.

A second, more fundamental limitation arises from Rayleigh Back Scattering (RBS). Light propagating along a fiber is scattered by the microscopic index variations in the glass, and some of the light scattered in the backward direction is captured by the optical fiber and propagates in the reverse direction. The power of the reflected beam is small, typically about 1000 times weaker than that of the primary beam. The limitation of Raman enhancement of noise performance results from RBS of the counterpropagating Raman beam. The back-scattered beam propagates in the same direction as the signal. When the Raman gain approaches 1000 (i.e., the Raman gain amplifies a propagating beam to 1000 times its power in the absence of the Raman gain), the back-scattered beam becomes so large that rather than enhancing the fidelity of the signal, the distributed Raman amplification severely degrades the signal fidelity and impairs the noise performance of the system.

SUMMARY OF THE INVENTION

Aspects of the invention include application of the recognition that, in a dispersion-compensating Raman optical amplifier which comprises a dispersion-compensating fiber (DCF) and a distributed Raman amplifier, the noise contributed to the system by the DCF is relatively large.

Generally, a Raman amplifier can be used in a DWDM optical system to maintain signal level across a span of transmission fiber, thus improving the signal-to-noise performance of the system and reducing the need to add regenerators. As discussed above, the ability of the distributed Raman pump to improve the noise performance of a system is subject to limitations caused by nonlinear effects and amplified spontaneous emission, and overall gain of the amplifier is subject to maintaining the gain balance. In an optical system using distributed Raman amplification and providing dispersion compensation using a DCF, the performance of the system is substantially limited by the noise contribution of the DCF. Accordingly, aspects of the present invention include a Raman amplifier providing dispersion compensation including a Raman amplifying DCF.

A first aspect of the present invention is an optical amplifier for amplifying an optical signal, comprising a distributed amplifier, a Raman-amplifying dispersion-compensating fiber amplifier having a dispersion-compensating fiber optically coupled to the distributed amplifier such that the optical signal is serially processed by the distributed amplifier and the Raman-amplifying dispersion-compensating fiber amplifier, and a first Raman pump optically coupled to and pumping the dispersion-compensating fiber.

A second aspect of the present invention is an optical amplifier for amplifying an optical signal, comprising a first distributed amplifier, a Raman-amplifying dispersion-compensating fiber amplifier having a dispersion-compensating fiber optically coupled to the distributed amplifier, a first Raman pump optically coupled to and pumping the dispersion-compensating fiber, and a third optical amplifier optically coupled to the optically amplifying dispersion-compensating fiber, wherein the optical signal is serially processed by the distributed amplifier, the Raman-amplifying dispersion-compensating fiber amplifier, and the third optical amplifier.

A third aspect of the present invention is an optical communications system for transmitting and amplifying an optical signal, comprising a span of transmission fiber, a distributed optical amplifier optically coupled to the transmission fiber, a Raman-amplifying dispersion-compensating fiber amplifier having a dispersion-compensating fiber optically coupled to the transmission fiber, and a first Raman pump optically coupled to and pumping the dispersion-compensating fiber, wherein the optical signal serially traverses the span of transmission fiber, the distributed amplifier, and the Raman-amplifying dispersion-compensating fiber amplifier.

A fourth aspect of the present invention is a method of amplifying an optical signal, comprising Raman pumping a transmission fiber using a Raman pump, propagating the optical signal through the Raman-pumped transmission fiber to provide a first signal output, Raman pumping a dispersion-compensating fiber using a Raman pump, and propagating the first signal output, received from the Raman-pumped transmission fiber, through the Raman-pumped dispersion-compensating fiber.

BRIEF DESCRIPTION OF THE FIGURES

It is to be understood that the following drawings are for the purpose of illustration only and are not intended as a definition of the limits of the invention. objects and advantages of the present invention will become apparent with reference to the following detailed description when taken in conjunction with the following drawings, in which.

DETAILED DESCRIPTION

Figure 2:
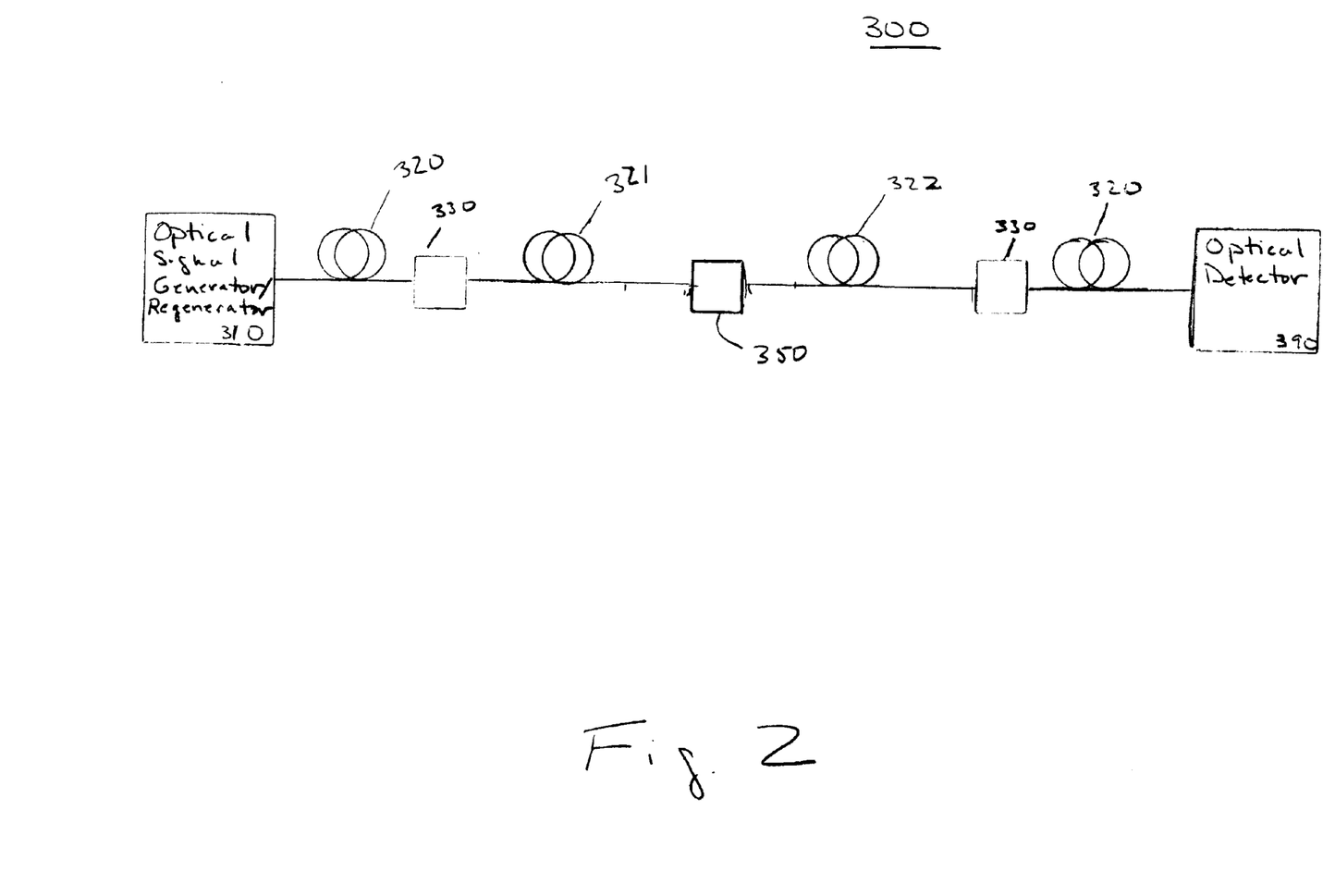
FIG. 2 illustrates one example of an embodiment of an optical communications system including an optical amplifier according to the present invention.

FIG. 2 illustrates one example of an embodiment of an optical communications system 300 including an optical amplifier 350 according to the present invention. Optical system 300 is a DWDM optical system for generating a plurality signals at any of the known optical bands.

Optical communications system 300 contains an optical signal generator/regenerator 310 for generating one or more of the plurality of optical signals which propagate along two or more spans of transmission fiber 320 (fiber spans). Optical generator 310 comprises one or more laser diodes. Each laser diode emits light at a specified optical wavelength within the desired band, and is modulated to generate one of the plurality of optical signals. Although the generator is illustrated as a single generator at a single location, one or more add/drop multiplexers (not shown) can be located along optical system 300 to add additional signals to the plurality of signals. An optical detector 390 produces an electronic and/or optical signal, which corresponds to one or more of the signals comprising the plurality of optical signals. Although the detector 390 is illustrated as a single generator at a single location, one or more add/drop multiplexers (not shown) can be located along system 300 to remove one or more signals from the plurality of signals.

The plurality of optical signals is propagated along one or more spans of optical fiber 320, 321, 322. Transmission fiber spans 320–322 can be any known optical fiber useful with DWDM systems having one or more transmission windows. Fiber span 321 is the fiber span that enters amplifier 350. Fiber span 322 is the fiber span that exits amplifier 350.

One or more amplifiers 330, using any know amplification technology, may be included between the spans of transmission fiber. Amplifiers 330 may include any known single-stage or multistage optical amplifier, such as erbium-doped fiber amplifiers or semiconductor amplifiers. Also included between signal generator 310 and detector 390 are one or more optical amplifiers 350 containing a Raman optical amplifier providing dispersion compensation according to the present invention.

Generally, it is desirable to maintain an adequate signal-to-noise ratio at all points along system 300. Thus, the amplifiers 330, 350 are spaced to maintain an adequate signal level, and the stages of each amplifier are arranged to maintain adequate signal level within the amplifier.

Figure 3:
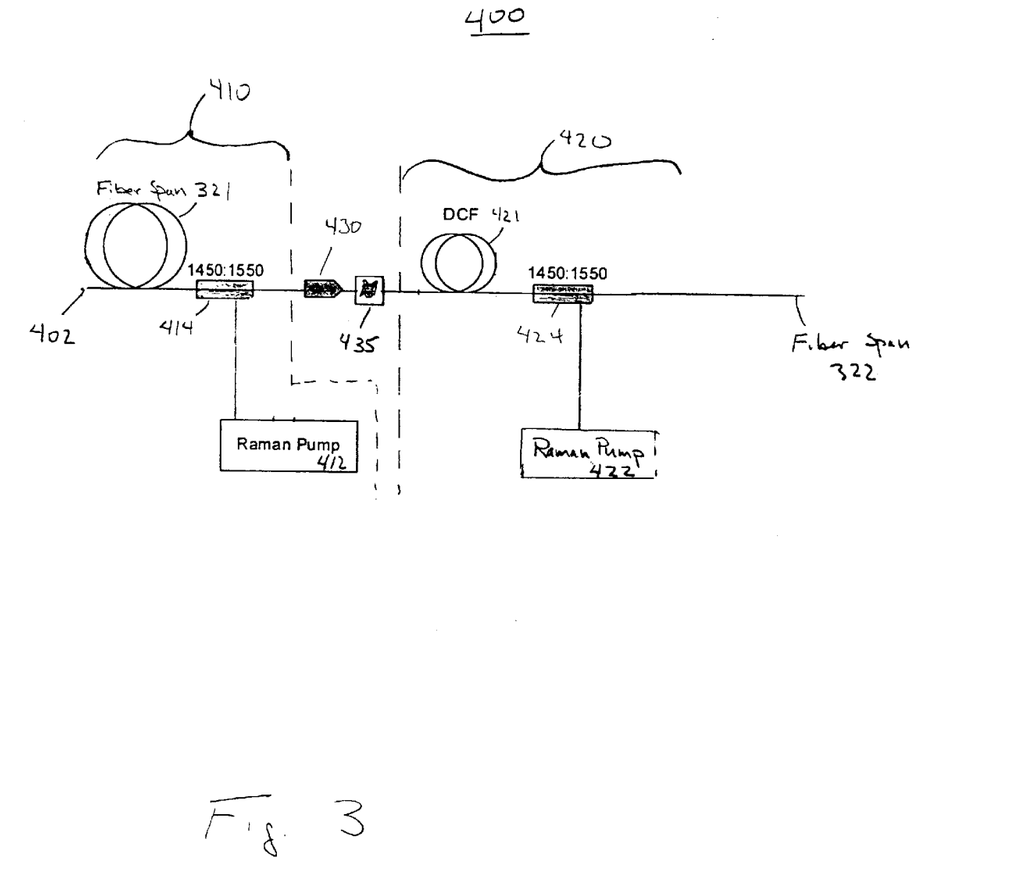
FIG. 3 illustrates one example of an embodiment of an optical amplifier according to the present invention.

FIG. 3 illustrates one example of an embodiment of an optical amplifier 400 containing a Raman optical amplifier providing dispersion compensation. Optical amplifier 400 is a two-stage amplifier containing a first stage 410 and a second stage 420. An optical signal entering amplifier 400 is amplified by first stage 410 and then the output of first stage 410 is amplified by second stage 420.

First stage 410 is a discrete or distributed Raman amplifier (i.e., an amplifier that provides amplification over a length of fiber). At least a portion of fiber span 321 is pumped by a Raman pump 412. In the illustrated embodiment, Raman pump 412 is coupled to fiber span 321 via a multiplexer 414 so that the light from Raman pump 412 propagates through transmission fiber span 321 in the reverse direction of propagation of the plurality of optical signals entering first stage 410 at 402. That is, the light from the Raman pump is backward propagated through fiber span 321. Typically, Raman amplification occurs over a 10 to 30 kilometer section of the length of fiber span 321; however, as one of ordinary skill would understand, longer or shorter sections of fiber may be used.

Second stage 420 is a Raman-amplifying dispersion-compensating fiber. Dispersion-compensating fiber 421 is any known dispersion-compensating fiber selected to have a length appropriate to compensate for dispersion occurring in transmission fiber 320. While the length of DCF 421 is typically selected to provide compensation for the span of fiber 321, one of ordinary skill in the art would understand that DCF 421 could be selected to compensate specifically for the dispersion occurring in transmission fiber 320 or any other portion of communication system 300. Typically, a DCF is 4 to 20 kilometers in length.

Dispersion-compensating fiber 421 is pumped by Raman pump 422. Raman pump 422 is coupled to DCF 421 via a multiplexer 424 so that the light from Raman pump 422 is backward propagated. Raman pump 422 can be directly coupled to DCF 421 or may be coupled to a section of transmission fiber 322 such that the light from Raman pump 422 is backward propagated into DCF 421.

As one of ordinary skill in the art would understand, multiplexers 414 and 424 are selected based on system parameters such as: the band of operation of system 300; the modulation rates of the optical signals; the wavelength of the signal coupled by multiplexer; and the power of the optical signals 18. Raman pumps 412 and 422 contain one or more laser diodes configured to provide amplification over a selected band corresponding to the wavelengths of the plurality of signals propagating in communications system 300. The optical powers of pumps 412 and 422 are chosen to provide a desired amount of Raman amplification in stages 410 and 420. In one embodiment, Raman pumps 412 and 422 include three pairs of laser diodes each. The wavelengths of each of the pairs of laser diodes are selected to have different Raman amplification shapes, and the two laser diodes comprising a pair are selected to have polarizations that are orthogonal.

The three pairs of laser diodes in each Raman pump have wavelengths selected to provide Raman amplification across the band corresponding to the wavelengths of the plurality of signals propagating in communications system 300. In the illustrated system, the plurality of signals contain light having a wavelength proximate 1550 run and the wavelengths of Raman pumps 412 and 422 are located proximate 1450 nm. The output powers of Raman pumps 412 and 422 may be selectable so that the amplifications provided by the first stage 410 and second stage 420 are variable.

In a second embodiment, Raman pumps 412 and 422 each include one laser. The lasers emit light having a first portion of light with a first polarization, and a second portion of light with a second polarization, and the first polarization is orthogonal to the second polarization. Preferably the first portion of light and the second portion of light have substantially equal strength.

Optionally an optical isolator 430 may be included between amplifier stages 410 and 420. Optical isolator 430 transmits forward-propagating light output from first stage 410 to second stage 420 and prevents backward-propagating light output from second stage 420 from reaching the first stage 410. Backward propagating light output from second stage 420 that optical isolator 430 prevents from reaching first stage 410 includes backward-propagating ASE, which is produced by second stage 420. Also, if the Raman-amplifying dispersion-compensating fiber of second stage 420 is configured to use backward propagation of light from Raman pump 424, optical isolator 430 is useful for preventing light from Raman pump 422 from reaching first stage 410. Optical isolator 430 permits first stage 410 to operate at or near a gain of 25 dB without allowing light from second stage 420 to enter first stage 410 and produce increased nonlinear effects. Accordingly, the combination of amplification of first stage 410 and amplification of the second stage 420 can exceed 25 dB.

One or more gain-flattening filters 435 may be included in system 300 to equalize substantially the strength of each of the signals at the output of the system. Unequal signal strength among the signals of different wavelengths may result from wavelength-dependent influences in the transmission or dispersion correcting fiber, or as a characteristic of any add/drop multiplexer included in the system. The gain-flattening filter 435 may be located prior to the Raman-amplifying dispersion-compensating fiber, immediately following the Raman-amplifying dispersion-compensating fiber, or elsewhere within amplifier 400 or system 300, as one of ordinary skill in the art would understand. Multiple gain-flattening filters may be included at multiple locations.

Figure 4:
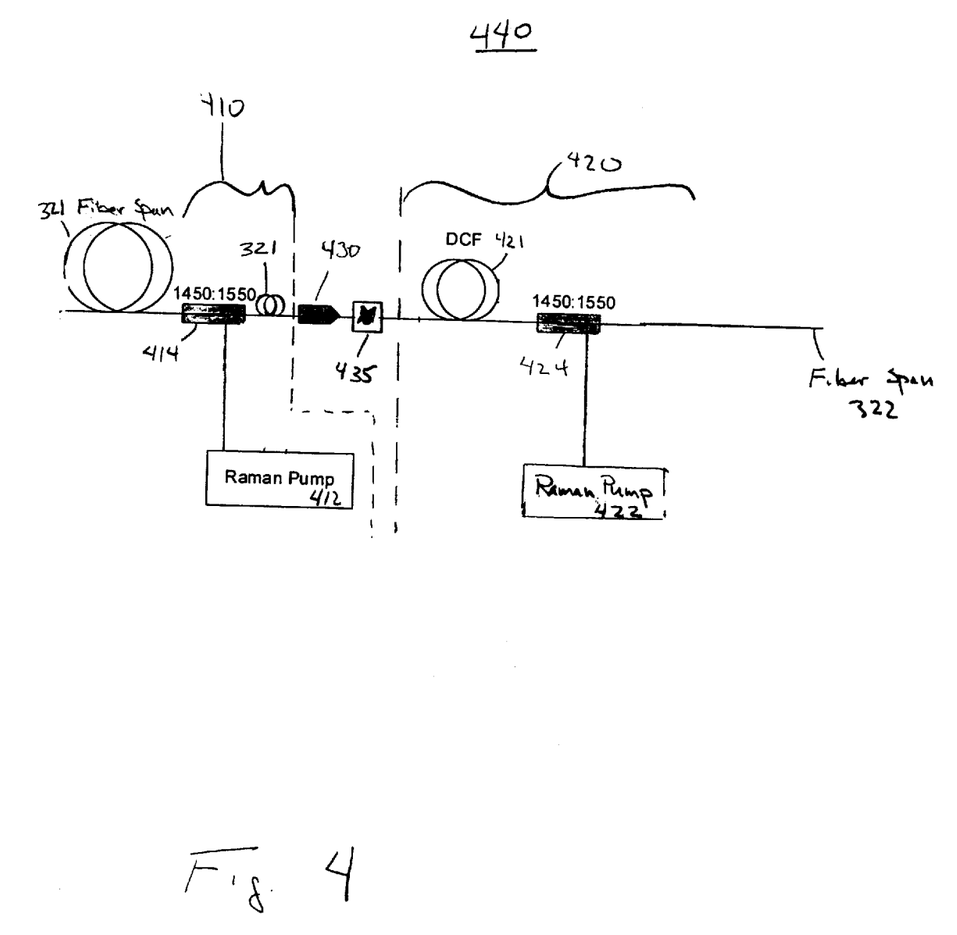
FIG. 4 illustrates a second example of an embodiment of a optical amplifier according to the present invention.

FIG. 4 illustrates a second example of an embodiment of an optical amplifier 440 containing a Raman optical amplifier providing dispersion compensation. In amplifier 440, multiplexer 414 is located within fiber span 321 and coupled to fiber span 321 so that the light from Raman pump 412 propagates through a portion of transmission fiber span 321 in the same direction as the plurality of optical signals. That is, the light from the Raman pump is forward propagated through fiber span 321.

Figure 5:
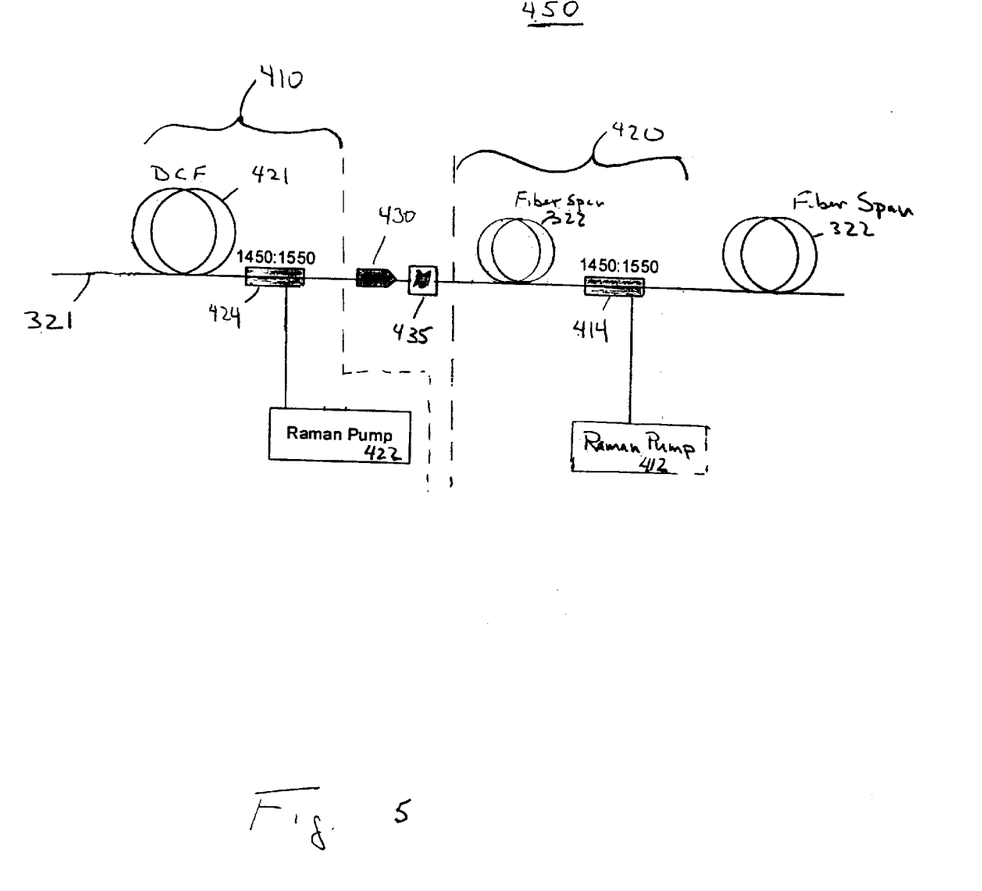
FIG. 5 illustrates a third example of an embodiment of an optical amplifier according to the present invention.

FIG. 5 illustrates a third example of an embodiment of an optical amplifier 450 containing a Raman optical amplifier providing dispersion compensation. Optical amplifier 450 is a two-stage amplifier that includes a first stage 410 that is a Raman-amplifying dispersion-compensating fiber and second stage 420 that is a distributed Raman amplifier. Multiplexer 414 is located within fiber span 322 so that at least a portion of fiber span 322 is pumped by Raman pump 412. As discussed above, an isolator 430 may be included to prevent backward ASE produced by second stage 420 from reaching the first amplification stage 410.

Figure 6:
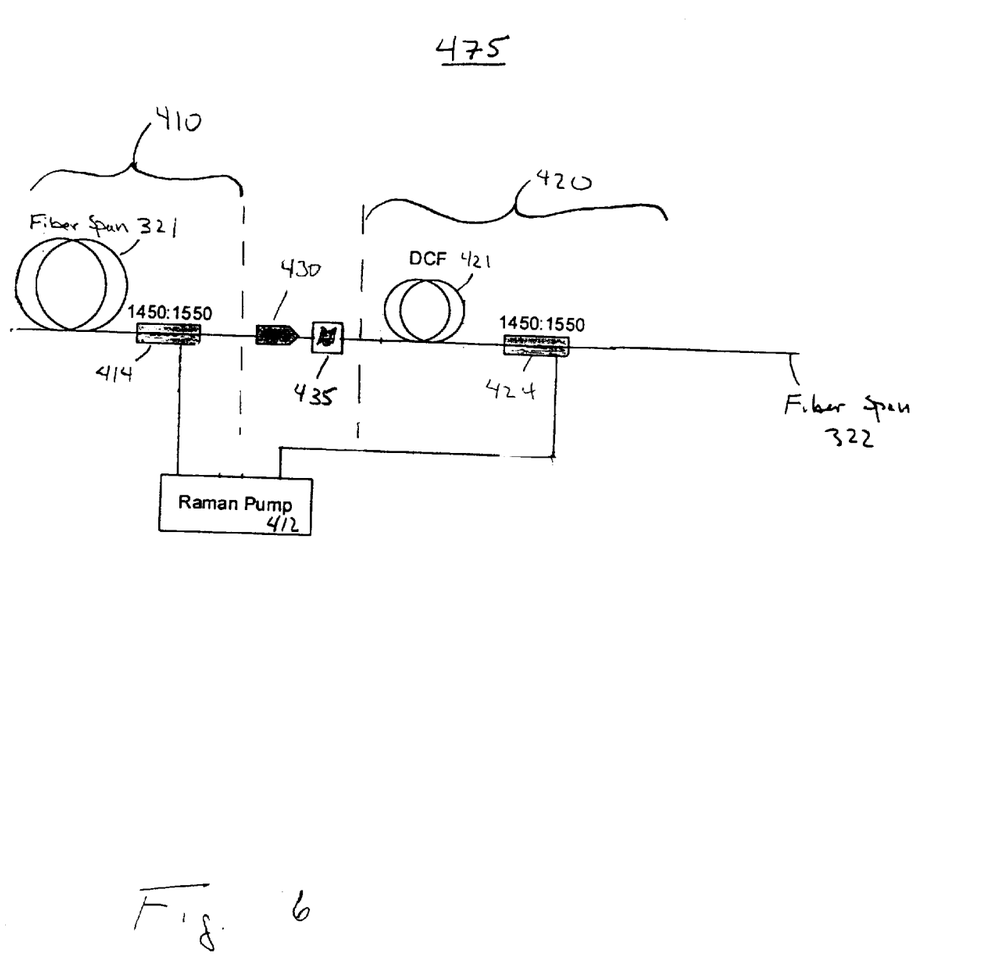
FIG. 6 illustrates a fourth example of an embodiment of an optical amplifier according to the present invention.

FIG. 6 illustrates a fourth example of an embodiment of an optical amplifier 475 containing a Raman optical amplifier providing dispersion compensation. In optical amplifier 475, output from Raman pump 412 is divided to pump both first stage 410 and second stage 420. Output from Raman pump 412 can be divided into two portions using any known means. The first portion can be used to pump first stage 410 via multiplexer 414 and the second portion can be used to pump second stage 420 via multiplexer 424.

Figure 7:
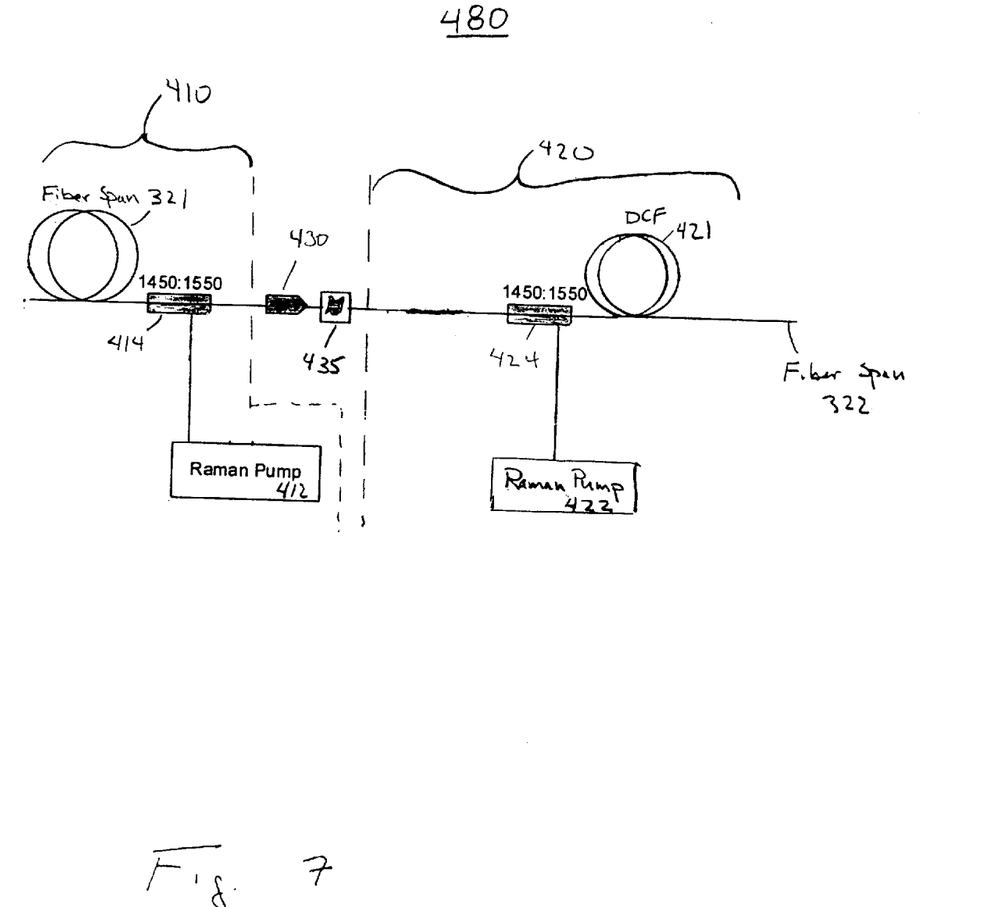
FIG. 7 illustrates a fifth example of an embodiment of an optical amplifier according to the present invention.

FIG. 7 illustrates a fifth example of an embodiment of an optical amplifier 480 containing a Raman optical amplifier providing dispersion compensation. In optical amplifier 480, multiplexer 424 is positioned prior to DCF 421 to allow for amplification using forward propagation of light from Raman pump 422. Alternatively, forward propagation can be maintained by positioning multiplexer 424 within DCF 421.

Figure 8:
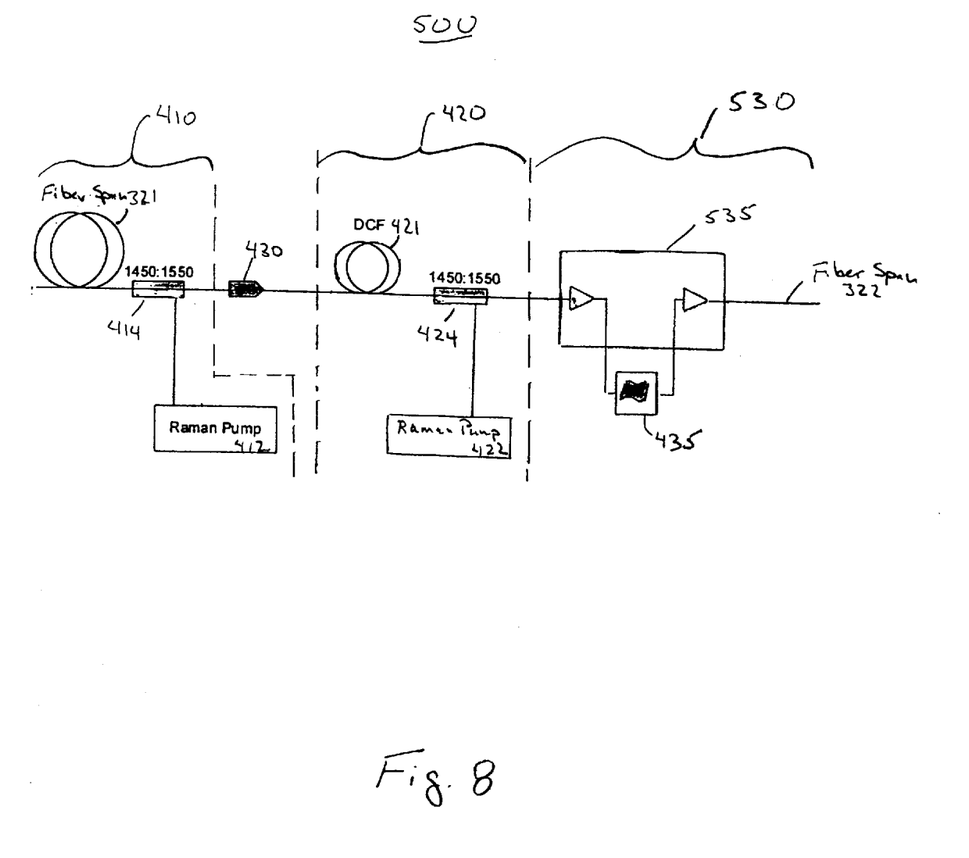
FIG. 8 illustrates a sixth example of an embodiment of an optical amplifier according to the present invention.

FIG. 8 illustrates a sixth example of an embodiment 500 of optical amplifier 350 containing a Raman optical amplifier providing dispersion compensation. Optical amplifier 500 is a three-stage amplifier containing a first stage 410 and a second stage that operate similarly to the first and second stages of optical amplifier 400. throughout the description, like elements among the embodiments are identically numbered for ease of identification.

Optical amplifier 500 includes a third stage 530. Although third stage 530 is illustrated as an erbium-doped optical amplifier 535, the third stage may alternatively be second discrete or distributed Raman amplifier or a semiconductor optical amplifier.

A gain-flattening filter 435 may be located within EDFA 535 to substantially equalize the power contained in each of the signals of the system. One embodiment of an EDFA 535 suitable for locating a gain-flattening filter within EDFA 535 is an EDFA module having fiber interfaces. Alternatively, the gain-flattening filter may be located immediately prior to EDFA 535, immediately following EDFA 535 or else where within amplifier 500. Multiple gain-flattening filters may be included at multiple locations in amplifier 500.

Figure 9:
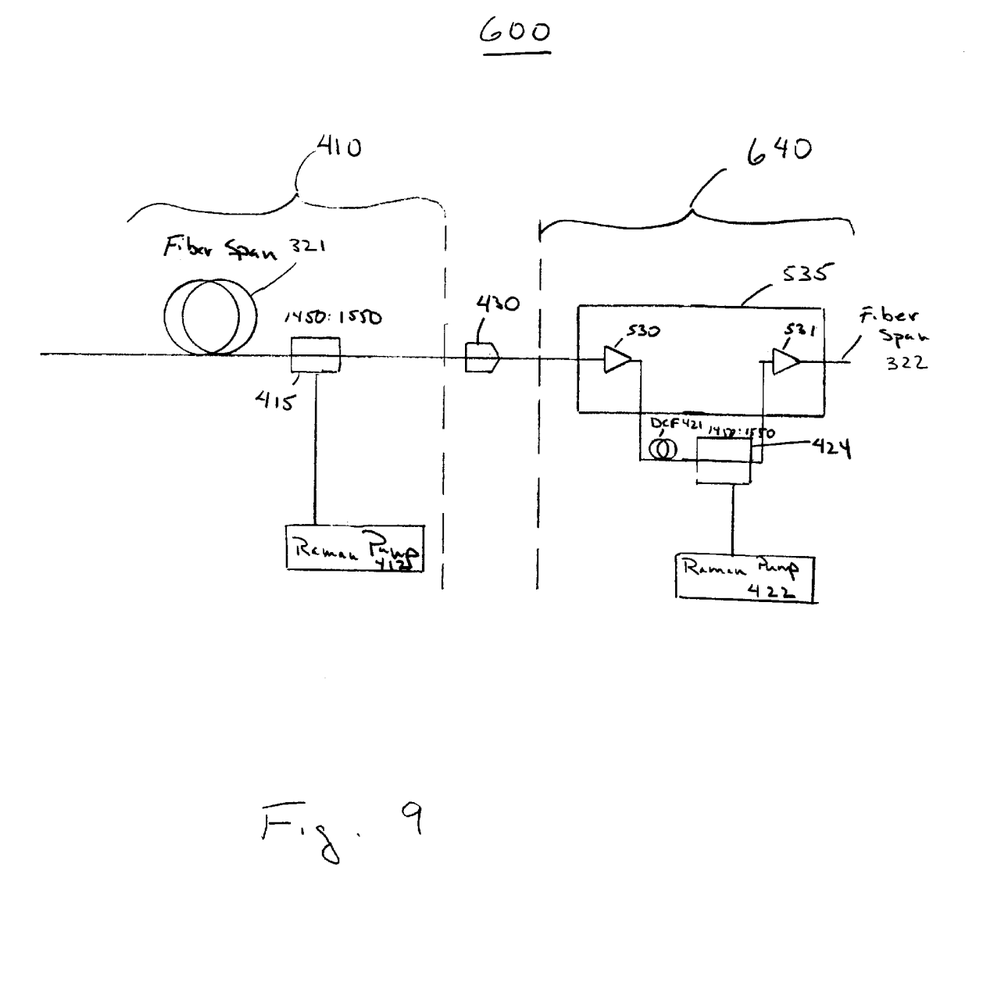
FIG. 9 illustrates a seventh example of an embodiment of an optical amplifier according to the present invention.

FIG. 9 illustrates a seventh example of an embodiment of optical amplifier 600 containing a Raman optical amplifier providing dispersion compensation according to the present invention. Amplifier 600 is a modified version of amplifier 500 where the second stage 420 and third stage 530 are combined, such that at least a portion of the amplification provided by EDFA 535 is provided before the Raman pumped DCF 421 by an EDFA segment 530 and a portion of the amplification is provide after the Raman pumped DCF 421 by an EDFA segment 531. Providing a portion of the erbium-doped amplifier before the Raman pumped DCF 421 allows the signal levels entering the DCF 421 to be amplified by the EDFA 535 before entering DCF 421. One embodiment of an EDFA 535 suitable for providing amplification both prior to and following DCF 421 is an EDFA module having fiber interfaces for coupling DCF 421 in series with the both segments of EDFA 530, 531.

Figure 10:
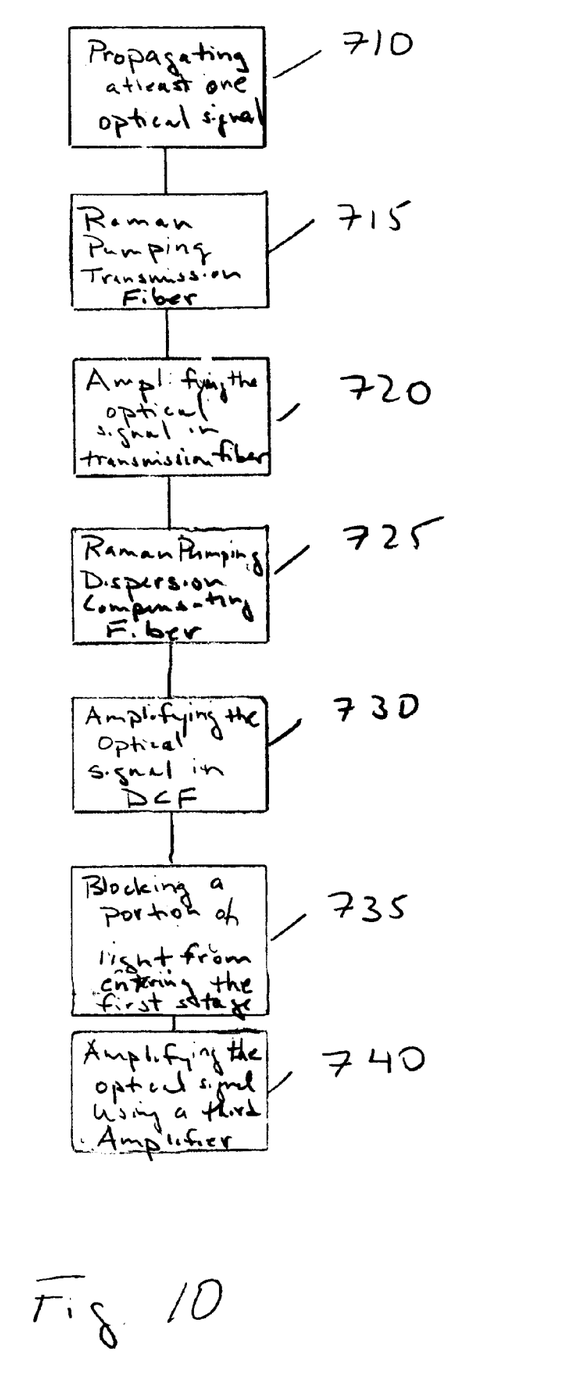
FIG. 10 is a flow chart of an example of a process for amplifying an optical signal according to the present invention.

FIG. 10 is a flow chart of an example of a process for amplifying an optical signal according to the present invention. At block 710, at least one optical signal is propagated into a fiber system. At block 715, at least a portion of a transmission fiber comprising the optical system is pumped with a wavelength of light to allow Raman amplification of the at least one optical signal. The light used to pump the transmission fiber can be forward propagating or backward propagating. At block 720, the at least one optical signal is amplified by propagating the signal through the Raman pumped transmission fiber. At block 725, at least a portion of a dispersion-compensating fiber is pumped with a wavelength of light to allow Raman amplification of the at least one optical signal. At block 730, the at least one optical signal is amplified by propagating the signal through the Raman pumped dispersion compensated fiber. Optionally, at block 735, a portion of the light pumped into the DCF can be blocked by an isolator to prevent the portion of light from reaching the Raman pumped transmission fiber. Optionally, at block 740, the at least one optical signal can be amplified by a third amplifier stage. The third amplifier stage can amplify the at least one optical signal using an Erbium-doped fiber amplifier, a semiconductor amplifier, or any other known optical amplifier.

Having thus described the inventive concepts and a number of exemplary embodiments, it will be apparent to those skilled in the art that the invention may be implemented in various ways, and that modifications and improvements will readily occur to such persons. Thus, the examples given are not intended to be limiting. The invention is limited only as required by the following claims and equivalents thereto.

We claim:

1. An optical amplifier for amplifying an optical signal, comprising:
    a distributed amplifier;
    Raman-amplifying dispersion-compensating fiber amplifier having a dispersion-compensating fiber optically coupled to the distributed amplifier such that the optical signal is serially processed by the distributed amplifier and the Raman-amplifying dispersion-compensating fiber amplifier; and
    a first Raman pump optically coupled to and pumping the dispersion-compensating fiber.

2. The optical amplifier of claim 1, further comprising a second Raman pump, wherein the distributed amplifier is a Raman amplifier pumped by the second Raman pump.

3. The optical amplifier of claim 1, further comprising a gain-flattening filter optically coupled in series with the distributed amplifier and the Raman-amplifying dispersion-compensating fiber amplifier.

4. The optical amplifier of claim 3, wherein the gain-flattening filter is electronically controllable.

5. The optical amplifier of claim 1, further comprising an optical isolator optically coupled to receive and transmit a forward-propagating output from one of the distributed amplifier and the dispersion-compensating fiber amplifier, and prevent a backward-propagating output from entering the other of the distributed amplifier and the dispersion-compensating fiber amplifier.

6. The optical amplifier of claim 1, wherein the distributed amplifier is a Raman amplifier, further wherein a portion of the output of the first Raman pump pumps the distributed amplifier.

7. The optical amplifier of claim 1, wherein the optical output of the first Raman pump is variable.

8. The optical amplifier of claim 2, wherein the optical output of the second Raman pump is variable.

9. The optical amplifier of claim 1, wherein the amplification of the optical amplifier exceeds 25 dB.

10. The optical amplifier of claim 1, wherein the amplification of the distributed amplifier is less than 25 dB.

11. The optical amplifier of claim 1, wherein the optical signal is first amplified by the distributed optical amplification stage and then amplified by the dispersion-compensating fiber amplifier.

12. The optical amplifier of claim 1, wherein the optical signal is first amplified by the dispersion-compensating fiber amplifier and then amplified by the distributed optical amplifier.

13. The optical amplifier of claim 1, wherein the first Raman pump pumps the dispersion-compensating fiber using backward propagation.

14. The optical amplifier of claim 1, wherein the first Raman pump pumps the dispersion-compensating fiber using forward propagation.

15. The optical amplifier of claim 2, wherein the second Raman pump pumps the distributed amplifier using backward propagation.

16. The optical amplifier of claim 2, wherein the second Raman pump pumps the distributed amplifier using forward propagation.

17. The optical amplifier of claim 1, wherein the first Raman pump comprises a plurality of lasers wherein the plurality of lasers comprises a first laser and a second laser, the first laser and the second laser emitting light at the same wavelength of light, further wherein the light from the first laser is polarized orthogonally to the light from the second laser.

18. The optical amplifier of claim 1, wherein the first Raman pump comprises a laser that emits light having a first portion of light with a first polarization, and a second portion of light with a second polarization, further wherein the first polarization is orthogonal to the second polarization.

19. The optical amplifier of claim 18, wherein the first portion of light and the second portion of light have substantially equal strength.

20. The optical amplifier of claim 2, wherein the second Raman pump comprises a plurality of lasers wherein the plurality of lasers comprises a first laser and a second laser, the first laser and the second laser emitting light at the same wavelength of light, further wherein the light from the first laser is polarized orthogonally to the light from the second laser.

21. The optical amplifier of claim 2, wherein the second Raman pump comprises a laser that emits light having a first portion of light with a first polarization, and a second portion of light with a second polarization, further wherein the first polarization is orthogonal to the second polarization.

22. The optical amplifier of claim 21, wherein the first portion of light and the second portion of light have substantially equal strength.

23. An optical amplifier for amplifying an optical signal, comprising: a first distributed amplifier;
   a Raman-amplifying dispersion-compensating fiber amplifier having a dispersion-compensating fiber optically coupled to the distributed amplifier;
   a first Raman pump optically coupled to and pumping the dispersion-compensating fiber;
   a third optical amplifier optically coupled to the optically amplifying dispersion-compensating fiber;
   wherein the optical signal is serially processed by the distributed amplifier, the Raman-amplifying dispersion-compensating fiber amplifier, and the third optical amplifier.

24. The optical amplifier of claim 23, wherein the third optical amplifier comprises an to erbium-doped fiber amplifier.

25. The optical amplifier of claim 23, wherein the third optical amplifier comprises a second distributed Raman amplifier.

26. The optical amplifier of claim 23, wherein the third optical amplifier comprises a discrete Raman amplifier.

27. The optical amplifier of claim 23, wherein the third optical amplifier comprises a semiconductor amplifier.

28. The optical amplifier of claim 23, further comprising a second Raman pump, wherein the first distributed amplifier is a Raman amplifier pumped by the second Raman pump.

29. The optical amplifier of claim 23, further comprising a gain-flattening filter optically coupled in series with the distributed amplifier, the Raman-amplifying dispersion-compensating fiber amplifier, and the third optical amplifier.

30. The optical amplifier of claim 29, wherein the gain-flattening filter is electronically controllable.

31. The optical amplifier of claim 23, further comprising an optical isolator optically coupled to receive and transmit a forward-propagating output from one of the distributed amplifier and the dispersion-compensating fiber amplifier, and prevent a backward-propagating output from entering the other of the distributed amplifier and the dispersion-compensating fiber amplifier.

32. The optical amplifier of claim 23, wherein the first distributed amplifier is a Raman amplifier, farther wherein a portion of the output of the first Raman pump pumps the first distributed amplifier.

33. The optical amplifier of claim 23, wherein the output of the first Raman pump is variable.

34. The optical amplifier of claim 28, wherein the output of the second Raman pump is variable.

35. The optical amplifier of claim 28, wherein the combined amplification of the distributed amplifier and the dispersion-compensating fiber amplifier exceeds 25 dB.

36. The optical amplifier of claim 28, wherein the amplification of the first distributed amplifier is less than 25 dB.

37. The optical amplifier of claim 23, wherein the optical signal is first amplified by the first distributed optical amplifier and then amplified by the dispersion-compensating fiber amplifier.

38. The optical amplifier of claim 23, wherein the optical signal is first amplified by the dispersion-compensating fiber amplifier and then amplified by the first distributed optical amplifier.

39. The optical amplifier of claim 28, wherein the second Raman pump pumps the first distributed amplifier using backward propagation.

40. The optical amplifier of claim 28, wherein the second Raman pump pumps the first distributed amplifier using forward propagation.

41. The optical amplifier of claim 23, wherein the first Raman pump comprises a plurality of lasers wherein the plurality of lasers comprises a first laser and a second laser, the first laser and the second laser emitting light at the same wavelength of light, further wherein the light from the first laser is polarized orthogonally to the light from the second laser.

42. The optical amplifier of claim 23, wherein the first Raman pump comprises a laser that emits light having a first portion of light with a first polarization, and a second portion of light with a second polarization, further wherein the first polarization is orthogonal to the second polarization.

43. The optical amplifier of claim 42, wherein the first portion of light and the second portion of light have substantially equal strength.

44. The optical amplifier of claim 28, wherein the second Raman pump comprises a plurality of lasers wherein the plurality of lasers comprises a first laser and a second laser, the first laser and the second laser emitting light at the same wavelength of light, further wherein the light from the first laser is polarized orthogonally to the light from the second laser.

45. The optical amplifier of claim 28, wherein the second Raman pump comprises a laser that emits light having a first portion of light with a first polarization, and a second portion of light with a second polarization, further wherein the first polarization is orthogonal to the second polarization.

46. The optical amplifier of claim 45, wherein the first portion of light and the second portion of light have substantially equal strength.

47. An optical communications system for transmitting and amplifying an optical signal, comprising:
   a span of transmission fiber;
   a distributed optical amplifier optically coupled to the transmission fiber;
   a Raman-amplifying dispersion-compensating fiber amplifier having a dispersion-compensating fiber optically coupled to the transmission fiber;
   a first Raman pump optically coupled to and pumping the dispersion-compensating fiber;
   wherein the optical signal serially traverses the span of transmission fiber, the distributed amplifier, and the Raman-amplifying dispersion-compensating fiber amplifier.

48. The optical communications system of claim 47, further comprising a second Raman pump, wherein the distributed amplifier is a Raman amplifier optically pumped by the second Raman pump.

49. The optical communication system of claim 47, wherein the distributed amplifier is a Raman amplifier, further wherein a portion of the output of the first Raman pump pumps the distributed amplifier.

50. The optical communications system of claim 47, wherein the optical output of the first Raman pump is variable.

51. The optical communications system of claim 48, wherein the optical output of the second Raman pump is variable.

52. The optical communications system of claim 48, wherein the combined amplification of the distributed amplifier and the dispersion-compensating fiber amplifier exceeds 25 dB.

53. The optical communications system of claim 48, wherein the amplification of the distributed amplifier is less than 25 dB.

54. The optical communications system of claim 47, wherein the optical signal is amplified by the distributed optical amplifier and then amplified by the dispersion-compensating fiber amplifier.

55. The optical communications system of claim 47, wherein the optical signal is amplified by the dispersion-compensating fiber amplifier and then amplified by the distributed optical amplifier.

56. The optical communications system of claim 48, wherein the second Raman pump pumps the distributed amplifier using backward propagation.

57. The optical communications system of claim 48, wherein the second Raman pump pumps the distributed amplifier using forward propagation.

58. The optical communications system of claim 47, wherein the first Raman pump comprises a plurality of lasers wherein the plurality of lasers comprises a first laser and a second laser, the first laser and the second laser emitting light at the same wavelength of light, further wherein the light from the first laser is polarized orthogonally to the light from the second laser.

59. The optical communications system of claim 47, wherein the first Raman pump comprises a laser that emits light having a first portion of light with a first polarization, and a second portion of light with a second polarization, further wherein the first polarization is orthogonal to the second polarization.

60. The optical communications system of claim 59, wherein the first portion of light and the second portion of light have substantially equal strength.

61. The optical communications system of claim 48, wherein the second Raman pump comprises a plurality of lasers wherein the plurality of lasers comprises a first laser and a second laser, the first laser and the second laser emitting light at the same wavelength of light, further wherein the light from the first laser is polarized orthogonally to the light from the second laser.

62. The optical communications system of claim 48, wherein the second Raman pump comprises a laser that emits light having a first portion of light with a first polarization, and a second portion of light with a second polarization, further wherein the first polarization is orthogonal to the second polarization.

63. The optical communications system of claim 62, wherein the first portion of light and the second portion of light have substantially equal strength.

64. A method of amplifying an optical signal, comprising:

Raman pumping a transmission fiber using a Raman pump;

propagating the optical signal through the Raman-pumped transmission fiber to is provide a first signal output;

Raman pumping a dispersion-compensating fiber using a Raman pump;

propagating the first signal output, received from the Raman-pumped transmission fiber, through the Raman-pumped dispersion-compensating fiber.

65. The method of amplifying of claim 64, wherein pumping a transmission fiber includes pumping the transmission fiber using backward propagation.

66. The method of amplifying of claim 64, wherein pumping a transmission fiber includes pumping the transmission fiber using forward propagation.

67. The method of amplifying of claim 64, wherein the optical signal is amplified by at least 25 dB.

68. The method of amplifying of claim 64, wherein the optical signal is amplified by less then 25 dB by propagating the optical signal through the transmission fiber.

69. The method of amplifying of claim 64, further comprising blocking light from entering the transmission fiber from the dispersion-compensating fiber.

70. The method of amplifying of claim 64, further comprising amplifying the optical signal using a third amplifier stage.

71. The method of amplifying of claim 70, wherein the third amplifier stage comprises an EDFA.

72. The method of amplifying of claim 70, wherein the third amplifier stage comprises a semiconductor amplifier.

73. The method of amplifying of claim 70, wherein the third amplifier stage comprises a distributed amplifier.

74. The method of amplifying of claim 70, wherein the third amplifier stage comprises a discrete amplifier.

* * * * *